No. 887,237. PATENTED MAY 12, 1908.
H. T. DUNBAR.
GAS ENGINE.
APPLICATION FILED MAR. 26, 1907.
2 SHEETS—SHEET 1.
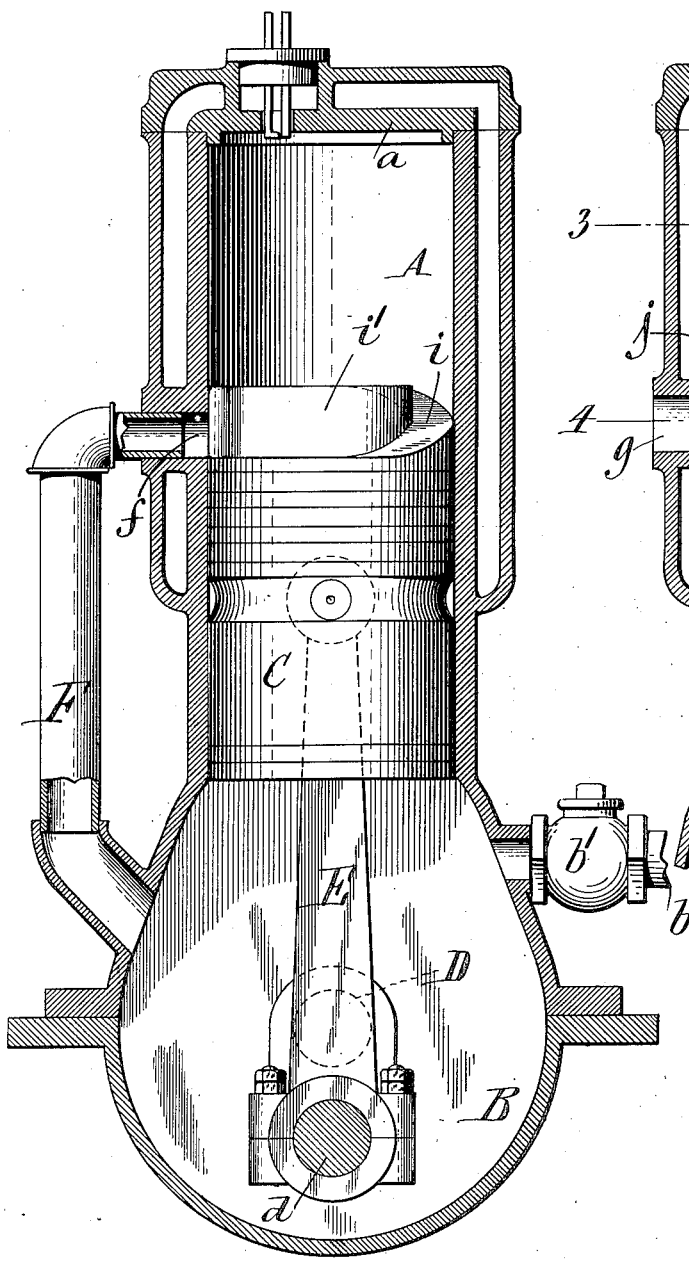
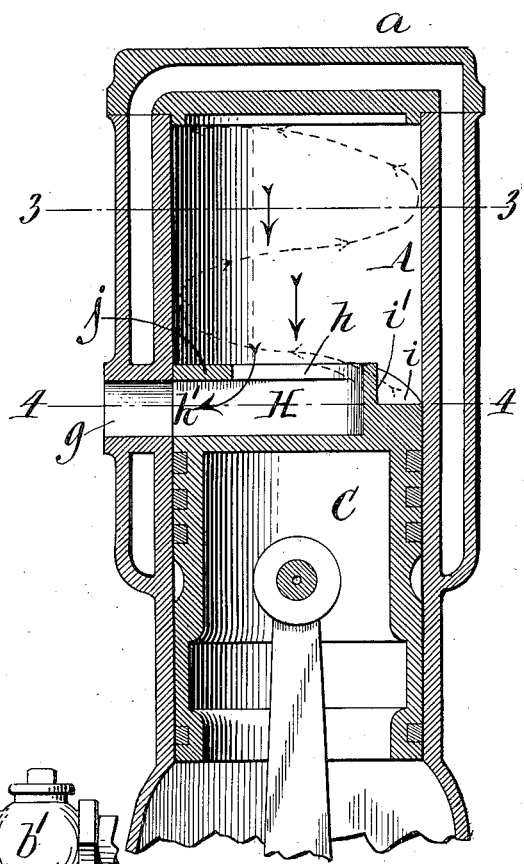
Witnesses,
Richard Sommer
Gustav W. Hora.
Inventor
Harris T. Dunbar
by Geiger & Popp
Attorneys.

No. 887,237. PATENTED MAY 12, 1908.
H. T. DUNBAR.
GAS ENGINE.
APPLICATION FILED MAR. 26, 1907.
2 SHEETS—SHEET 2.
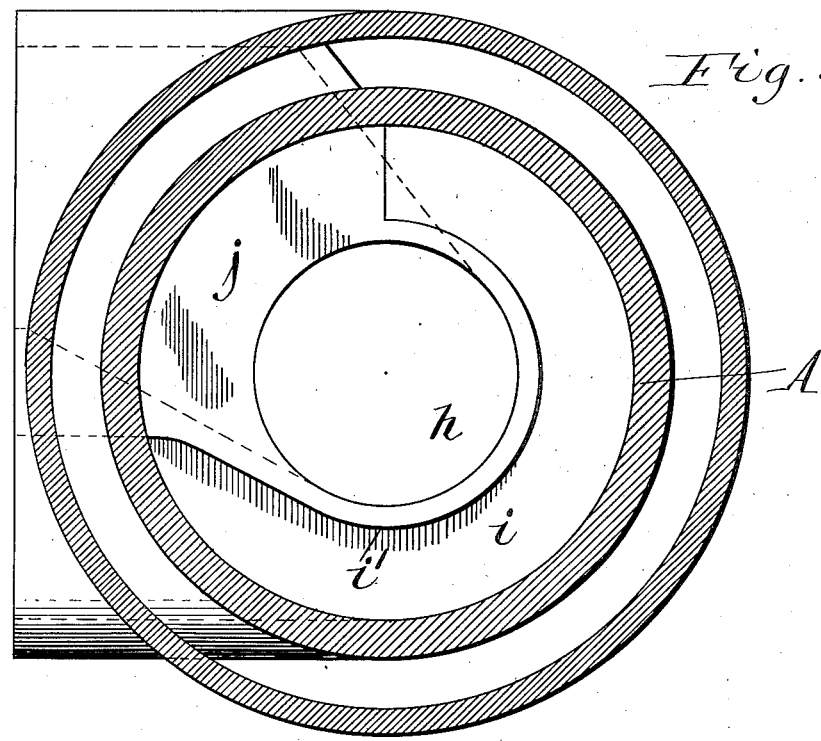
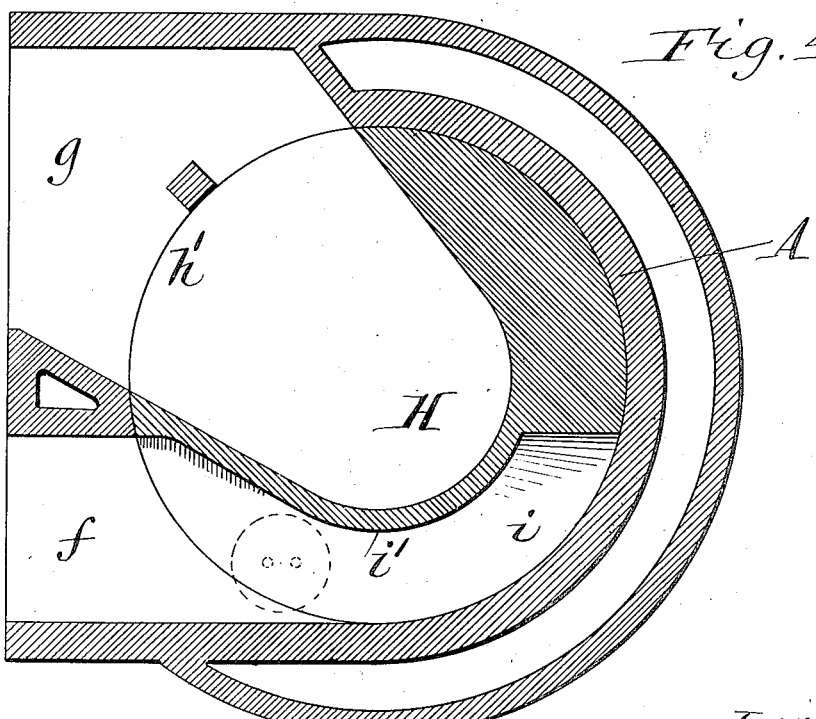

UNITED STATES PATENT OFFICE.

HARRIS T. DUNBAR, OF BUFFALO, NEW YORK.

GAS-ENGINE.

No. 887,237.      Specification of Letters Patent.      Patented May 12, 1908.

Application filed March 26, 1907. Serial No. 364,622.

*To all whom it may concern:*

Be it known that I, HARRIS T. DUNBAR, a citizen of the United States, residing at Buffalo, in the county of Erie and State of New York, have invented a new and useful Improvement in Gas-Engines, of which the following is a specification.

This invention relates to a two-stroke cycle gas or hydrocarbon engine.

In the type of engine as heretofore usually constructed the fuel inlet and exhaust ports are arranged on diametrically opposite sides of the cylinder and the piston is provided with a deflector, so that when the piston reaches the end of its forward or working stroke and uncovers the inlet and exhaust ports the fuel will be directed toward the head of the cylinder and prevented from passing out through the exhaust port. While this answers the purpose sufficiently well to produce an operative engine, it is defective in that the dead or spent gases are never wholly removed from the cylinder and therefore impair the efficiency of the engine by becoming mixed with live or fresh gases. Furthermore, by drawing off the hot dead gases on one side of the cylinder and admitting the cool live gases on the opposite side of the same, a difference in the expansion of the metal on opposite sides of the cylinder is maintained which renders it impossible to keep the piston tight for any length of time and results in loss of compression and output of power.

The object of this invention is to so construct the engine that the dead gases move simultaneously inward from all parts of the cylinder and escape at the center of the same while the live gases fill in the cylinder all around the escaping dead gases, thereby relieving the cylinder uniformly from the heat of the dead gases and also bringing the cool live gases uniformly in contact with all parts of the cylinder, whereby the incoming fuel is raised in temperature and its power producing capacity is increased and the temperature of the cylinder is reduced, causing the parts to operate more reliably and effectively.

In the accompanying drawings consisting of 2 sheets: Figure 1 is a vertical section of a two-stroke cycle engine embodying my invention, the section being taken at the side of the piston. Fig. 2 is a fragmentary vertical section of the same taken centrally through the piston. Figs. 3 and 4 are transverse sections, on an enlarged scale, in the correspondingly numbered lines in Fig. 2.

Similar letters of reference indicate corresponding parts throughout the several views.

My invention is applicable to two-stroke cycle gas engines of various constructions as to general organization. That shown in the drawings, as an example, consists of an upright cylinder A having its upper end closed by a head $a$, a closed or tight crank case B connected with the lower end of the cylinder and having a fuel supply pipe $b$ containing a check valve $b^1$, a piston C reciprocating vertically in the cylinder, a crank shaft D having a crank $d$ within the crank case, a pitman E connecting the crank with the piston, a transfer passage or pipe F connected at one end with the crank case while its opposite end connects with a fuel or gas inlet port $f$ opening into the side of the cylinder adjacent to the point where the upper end of the piston terminates when the same reaches the end of its forward stroke, and $g$ an exhaust port arranged in the side of the cylinder.

In carrying out my invention in the best form, it is preferable to locate the inlet and exhaust ports $f$, $g$ horizontally in line and adjacent to each other circumferentially on the same side of the cylinder, as shown in Fig. 4.

Within the upper or inner end of the piston the same is provided with an exhaust chamber or passage H which has an upper or inner opening $h$ extending through the central part of the piston and placing the exhaust chamber in communication with the central part of the space in the cylinder, and a side port or opening $h^1$ leading laterally through the side of the piston and placing the exhaust chamber in communication with the exhaust port $g$ during the last part of the forward stroke of the piston.

On the inner end of the piston the same is provided with a spiral flue or guide-way which extends about three-fourths of a circle around the hopper opening of the exhaust passage. The bottom $i$ of this flue or guideway is inclined and its front or lower end is arranged below the upper end of the piston forming a curved vertical wall $i^1$ between this part of the bottom and the exhaust passage in the piston. The rear or upper end of the bottom $i$ terminates at the top of the piston. Between the elevated rear end and the depressed front end of the bottom $i$ the top of the piston is provided with a flat or straight face or bridge $j$ which extends over the side opening $h^1$ of the exhaust chamber or passage in the piston.

The bottom of the guide-way together with the side wall $i$ of the piston and the adjacent part of the bore of the cylinder form the spiral flue conduit or passage which first receives the fresh gas upon entering the cylinder and which controls the course of the gas in the cylinder. The gas is admitted into the cylinder during the last part of the forward stroke of the piston at which time the piston uncovers the fuel inlet or port $f$ and brings the lower end of the guide flue or passage in line therewith.

The relative arrangement of the fuel inlet and exhaust ports in the cylinder is such that during the last portion of the forward stroke of the piston the exhaust port $g$ is uncovered by the piston slightly in advance of the fuel inlet port $f$. When the exhaust port is thus uncovered the compressed spent gases rush instantly from the center of the cylinder into the central opening of the exhaust chamber in the piston and thence laterally through the side port of the same and then escape through the exhaust port. Immediately after the exhaust port has been uncovered by the piston and the pressure of the spent gases in the cylinder has been relieved the fuel inlet port $f$ is also uncovered by the piston. The fuel or gas under pressure in the crank chamber now enters the lower end of the guide-way or flue and is directed by the inclined bottom $i$, curved wall $i^1$ of the piston and the curved bore of the cylinder inwardly and upwardly in a spiral path into the lower end of the cylinder. Upon reaching the upper end of the inclined bottom of the guide-way the gaseous fuel passes over the bridge $j$ above the side opening of the exhaust chamber and continues its movement in a spiral path above the fuel inlet port so as not to interfere with the inflow of fuel. The fresh fuel continues to move upwardly in a spiral path and sweeps the bore of the cylinder and when it reaches the top thereof it gradually fills the cylinder from the bore to the center thereof, thereby displacing the spent gases and crowding the latter gradually from the bore of the cylinder toward the center thereof and out through the central exhaust in the piston. By this means the spent gases are exhausted first from the center of the cylinder where they are hottest and at the same time the cylinder is cooled by the incoming fresh gases whereby undue heating of the engine is avoided, the life of the same is prolonged and the running of the same is improved.

Inasmuch as the fresh gas maintains a constant whirling action around the spent gases and the latter move radially and axially outwardly under the pressure of the new incoming gas the live and dead gases are divided into distinct zones whereby the liability of mixing the dead and live gases is reduced to a minimum, enabling the charges of fuel to be maintained practically pure, and rendering it possible to obtain the maximum power therefrom.

Owing to the spiral movement of the fresh gas in the cylinder around the burned gas it is impossible for unburned gas to escape through the exhaust inasmuch as the unburned gas must travel the maximum distance in the cylinder before reaching the exhaust and by the time it reaches this point the exhaust is closed by the piston and the latter begins to compress the charge of new fuel.

Any suitable form of igniter $k$ may be used that shown in the drawings being of the jump spark type and located in the cylinder, so that the same is received by the front part of the fresh gas guide passage in the piston at the end of its compression stroke, whereby the igniter is certain of being surrounded by fresh gas and ignition of the same is positively assured.

I claim as my invention:

1. A gas engine comprising a cylinder having a fuel port and an exhaust port, and a piston arranged in the cylinder and having a spiral guide-way whereby the fuel is caused to whirl in said cylinder, substantially as set forth.

2. A gas engine comprising a cylinder having a fuel port in its side and a piston arranged in the cylinder and having a fuel guide-way which extends spirally around the periphery of the piston and is adapted to stand with its lower front end opposite said fuel port when the piston is in its foremost position while its upper rear end terminates on the inner side of the piston, substantially as set forth.

3. A gas engine comprising a cylinder having a fuel port in its side, and a piston arranged in said cylinder and having a spiral fuel guide-way the inclined bottom of which is arranged along the periphery of the piston and the side walls of which are formed one on the piston and the other by the bore of the cylinder, and the lower end of said guide-way being adapted to register with the fuel port, substantially as set forth.

4. A gas engine comprising a cylinder having fuel and exhaust ports in its side, and a piston arranged in said cylinder and having an exhaust conduit which opens centrally into the cylinder and adapted to communicate laterally with said exhaust port and which is also provided with a spiral fuel guide-way around said exhaust conduit which is adapted to register at its lower end with said fuel port while its upper end directs the fuel into the cylinder, substantially as set forth.

5. A gas engine comprising a cylinder having fuel and exhaust ports in its side and circumferentially adjacent to each other, a piston having an exhaust conduit which is provided with an upper central opening on its inner end whereby the same communicates with the central part of the space in the cylinder and which has a lower lateral opening adapted to register with said exhaust port, and said piston being also provided with a spiral fuel guide-way between the periphery of the piston and said exhaust conduit which is so constructed that the lower front end of said guide-way registers with said fuel port in the foremost position of the piston while the upper or rear end of said guide-way is elevated above the front end thereof, and a bridge forming the top of the lateral opening of said exhaust conduit and extending from the rear end of the guide-way to a point above the front end thereof, substantially as set forth.

Witness my hand this 25th day of March, 1907.

HARRIS T. DUNBAR.

Witnesses:
 THEO. L. POPP,
 ANNA HEIGIS.